E. F. McLAUGHLIN.
CAR DOOR.
APPLICATION FILED AUG. 18, 1914.
1,126,241.
Patented Jan. 26, 1915.
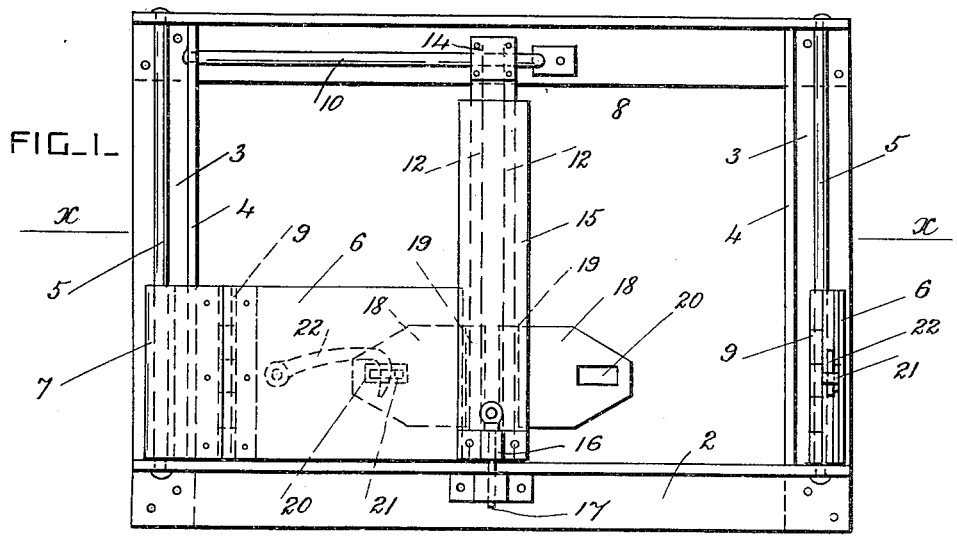
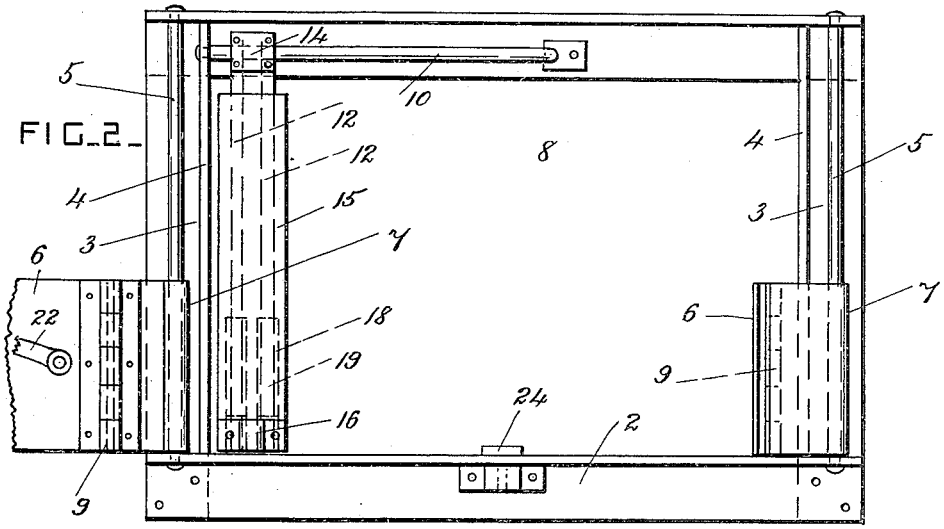
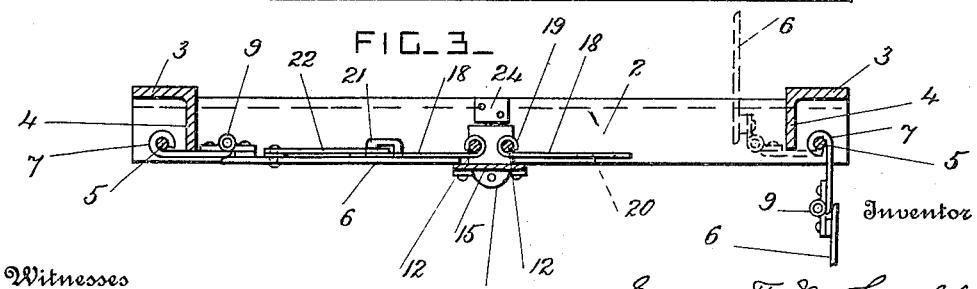
Witnesses
Wm H. Bates
Albert Popkins
Inventor
Eugene F. McLaughlin
By Herbert W. Jenner.
Attorney

UNITED STATES PATENT OFFICE.

EUGENE F. McLAUGHLIN, OF ANOKA, MINNESOTA, ASSIGNOR OF ONE-HALF TO THOMAS S. HERING, OF ANOKA, MINNESOTA.

CAR-DOOR.

1,126,241.  Specification of Letters Patent.  Patented Jan. 26, 1915.

Application filed August 18, 1914.  Serial No. 857,340.

*To all whom it may concern:*

Be it known that I, EUGENE F. MCLAUGHLIN, a citizen of the United States, residing at Anoka, in the county of Anoka and State of Minnesota, have invented certain new and useful Improvements in Car-Doors; and I do hereby declare the following to be a full, clear, and exact description of the invention, such as will enable other skilled in the art to which it appertains to make and use the same.

This invention relates to the doors of railroad cars chiefly used in the transportation of grain; and it consists in the novel construction and combination of the parts hereinafter fully described and claimed.

In the drawings, Figure 1 is a front view of a car door constructed according to this invention and showing one door section closed and with the center plate in its normal positions. Fig. 2 is a similar view, but shows one of the door sections turned inwardly and the center plate moved to one side of the door opening. Fig. 3 is a sectional plan view, taken on the line $x$—$x$ in Fig. 1.

The frame 2 of the door is of any approved construction, and in the example shown it is formed of angle-shaped bars riveted together. The two vertical bars 3 form the sides of the door opening, and they have flanges 4 which project forwardly from their adjacent edges. Pivot rods 5 are secured to the frame, and are arranged in the angles of the vertical bars 3.

The door is formed of similar door sections 6 arranged in pairs and provided at one end with eyes 7 which are arranged to pivot on and to slide vertically on the rods 5. Any number of pairs of door sections may be provided, and in the example shown provision is made for two similar pairs, leaving a space at the upper part of the door opening 8 to permit the door sections to slide vertically to a limited extent. A single pair of wide door sections might be used, or more than two pairs of very narrow door sections, in carrying out this invention. Each door section is preferably formed of two plates connected together by hinges 9 on their rear sides, so that the main or outer plate may be turned on its hinges to project within the car, and form an angle with the other plate, as shown in Fig. 3 in dotted lines.

A track or track bar 10 is secured horizontally at the upper part of the door opening, and 12 are two vertical pivot rods the upper ends of which are provided with a bearing block 14 which is slidable longitudinally on the track bar 10. A center plate 15 is secured to the end portions of the front sides of the two rods 12, and holds them parallel to each other. The bottom part of the plate 15 has an eye 16, and a locking pin 17 is arranged to slide vertically in this eye and engage with a hole in the bottom member of the door frame.

Flaps 18 are provided and have eyes 19 which are pivoted on and slide vertically on the pivot rods 12. The flaps 18 have holes or slots 20 in them, and locking loops 21 are provided on the backs of the main plates of the door sections. The plates of the door sections are moved a little out of line on the hinges 9, in closing the door, to permit the main plates to pass behind the edges of the center plate, and the plates of the door sections are then placed in line with each other. When the door sections are closed the loops 21 project through the slots 20, and hooks 22 are pivoted to the door plates for engaging with the projecting portions of the loops and securing the door sections in their closed positions. When the door sections and the flaps are thus secured together, they can be slid vertically on the pivot rods 5 and 12. Any other approved fastening devices may be used for locking the door sections to the flaps, in carrying out this invention, and also for locking the center plate and the pivot rods 12 in place. A stop 24 is provided on the lower part of the frame for the lower end portions of the center plate and the pivot rods 12 to bear against when secured in the middle of the door opening.

When the car is used for large and bulky objects, and a wide door opening is desirable, the center plate with the parts secured to it is slid to one side of the door opening, as shown in Fig. 2, and the flaps 18 are turned rearwardly so as not to be in the way.

When the door sections are turned inwardly the hinged parts rest against the edges of the flanges 4 of the side bars of the frame, which edges form stops for them. The hinges which connect the plates of the door sections permit the main or outer plates to be placed in engagement with the rear side of the center plate, so that the main plates are locked between the center plate and the flaps. This makes the door grain-tight and weather-tight, and it makes it impossible for the doors to be jarred open by the motion of the train in passing over a rough railroad track.

What I claim is:

1. In a car door, the combination, with a door frame provided with pivot rods at its sides, of a movable center piece provided with pivot rods and having means for securing it at the middle part of the door frame, flaps engaging with the pivot rods of the center piece, door sections engaging with the pivot rods of the frame, and locking devices for securing the door sections to the said flaps.

2. In a car door, the combination, with a door frame provided with pivot rods at its sides, and a horizontal track secured to the upper part of the frame; of a center piece provided with pivot rods and having a bearing which is slidable on the said track and having also means for securing it at the middle part of the said door frame, flaps engaging with the pivot rods of the center piece, door sections engaging with the pivot rods of the frame, and locking devices for securing the door sections to the said flaps.

In testimony whereof I have affixed my signature in the presence of two witnesses.

EUGENE F. McLAUGHLIN.

Witnesses:
F. S. STEWART,
EDWARD BUTLER.

Copies of this patent may be obtained for five cents each, by addressing the "Commissioner of Patents, Washington, D. C."